United States Patent
Goebel et al.

(10) Patent No.: US 6,730,141 B2
(45) Date of Patent: May 4, 2004

(54) DEVICE AND METHOD FOR SELECTIVELY REMOVING GASEOUS POLLUTANTS FROM THE AMBIENT AIR

(75) Inventors: Johann Goebel, Munich (DE); Helmut Oberpriller, Kleinhoehenrain (DE); Peter Peuser, Riemerling (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/194,139

(22) Filed: Jul. 11, 2002

(65) Prior Publication Data

US 2003/0019355 A1 Jan. 30, 2003

(30) Foreign Application Priority Data

Jul. 12, 2001 (DE) .......................................... 101 33 831

(51) Int. Cl.$^7$ ............................................... B03C 3/016
(52) U.S. Cl. ..................... 95/57; 95/58; 96/16; 96/224; 422/4; 422/22; 422/24; 422/121
(58) Field of Search .......................... 96/16, 224; 95/57, 95/58; 422/4, 5, 22, 24, 121, 122

(56) References Cited

U.S. PATENT DOCUMENTS

| | | | | |
|---|---|---|---|---|
| 3,154,682 A | * | 10/1964 | Hartz et al. ..................... | 96/16 |
| 3,744,216 A | | 7/1973 | Halleran ........................ | 96/16 |
| 4,203,948 A | * | 5/1980 | Brundbjerg ..................... | 422/121 |
| 4,543,484 A | | 9/1985 | Meyerand, Jr. et al. ........ | 95/69 X |
| 4,574,004 A | | 3/1986 | Schmidt-Ott et al. .......... | 95/79 |
| 4,750,917 A | * | 6/1988 | Fujii ........................... | 422/24 X |
| 4,876,852 A | * | 10/1989 | Abthoff et al. ................ | 96/16 |
| 5,154,733 A | * | 10/1992 | Fujii et al. .................... | 96/16 |
| 5,288,305 A | * | 2/1994 | Gellert et al. ................. | 96/16 X |
| 5,431,714 A | * | 7/1995 | Burtscher et al. .............. | 95/57 |
| 5,476,538 A | * | 12/1995 | Nishio et al. .................. | 422/4 X |
| 5,935,538 A | * | 8/1999 | Tabatabaie-Raissi et al. .. | 95/57 X |
| 5,993,738 A | * | 11/1999 | Goswani ....................... | 422/22 |
| 6,149,717 A | * | 11/2000 | Satyapal et al. ............... | 96/16 |
| 6,187,271 B1 | * | 2/2001 | Lee et al. ...................... | 422/122 X |

FOREIGN PATENT DOCUMENTS

| | | |
|---|---|---|
| DE | 36 25 771 | 2/1990 |
| DE | 36 85 580 | 1/1993 |
| DE | 298 08 126 | 10/1998 |
| DE | 197 30 291 | 1/1999 |
| DE | 197 36 293 | 2/1999 |
| DE | 198 23 611 | 12/1999 |
| EP | 0 241 555 | 10/1987 |
| GB | 931 625 | 7/1963 |

* cited by examiner

Primary Examiner—Richard L. Chiesa
(74) Attorney, Agent, or Firm—Kenyon & Kenyon

(57) ABSTRACT

A method is for selectively removing gaseous pollutants from the ambient air, and a device is for implementing the method. Undesirable emissions may be selectively and completely removed from the ambient air using relatively simple equipment and a small amount of energy. Pollutants contained in the air to be purified are ionized by the action of optical radiation, based on resonant and/or non-resonant single-photon excitation and/or multiple-photon excitation, so that the ionized pollutants are drawn off and removed from the air to be purified, using an electric field. A small portion of the energy necessary for the ionization may also be applied in the form of microwave energy or electric-field energy. The method and device may be used in air-conditioning or other air-circulation systems.

30 Claims, 1 Drawing Sheet

DEVICE AND METHOD FOR SELECTIVELY REMOVING GASEOUS POLLUTANTS FROM THE AMBIENT AIR

FIELD OF THE INVENTION

The present invention relates to a device and a method for selectively removing gaseous pollutants from the ambient air, in particular in vehicle passenger compartments, aircraft passenger compartments, etc.

BACKGROUND INFORMATION

Air pollutants in interior spaces where people stay, such as in airplanes, passenger cars, offices, etc., represent a considerable problem for health and well-being. Air pollutants are emitted by pieces of equipment, surface coatings, etc., as well as during activities such as cooking, roasting and frying, and also by people in the room. In addition, substances other than air may also enter interior spaces from outside (e.g. emissions from traffic and/or industry). In order to prevent effects detrimental to the human organism, extensive filtering measures are necessary for treating and purifying the ambient air.

Devices based on non-regenerative adsorption processes are used to purify air. In this connection, filters having activated carbon, modified activated carbon, or zeolites are used. For example, German Published Patent Application Nos. 198 23 611 and 197 30 291 describes devices for removing pollutants, odorous substances, and toxic gases from air streams, the latter describing two adsorbers that may be alternately switched to adsorption mode and desorption mode (regenerative process). However, the efficiency of conventional adsorbents is limited, especially in the range of low concentration, i.e. in the emissions range in which concentrations typically lie in the ppb range (also referred to below as indoor air), since the loading linearly decreases with the pollutant concentration (Henry's Law). In order to retain a good filtering efficiency, the adsorber filters must be replaced or regenerated after a certain period of time. In addition, the efficacy and efficiency of the air purification is strongly dependent on environmental influences, in particular temperature and moisture. Additionally, microbial growth or an accumulation of fungi, bacteria, and pollen can cause the filter to become a health risk that should not be neglected. In addition, devices having such filter systems normally occupy a large volume that is particularly unavailable in automobiles and aircraft.

Devices and methods for purifying air may also ionize the entire volume of air. As described in German Published Patent Application No. 197 36 293, the ionization can be achieved using corona discharge. However, other air ionizers include ionization chambers and electrostatic filter systems (as illustrated in German Published Patent No. 298 08 126). The need to ionize all of the air results in a high power requirement, since the ionization routes used here must be supplied with appropriately high voltage. At the same time, the efficiency is usually disappointing. Many such systems are not effective enough to fulfill increasingly strict legal conditions. Another disadvantage attributed to ionizing oxygen molecules and nitrogen molecules is the formation of reactive ozone and nitrogen oxides.

The situation is similar with plasma-oxidation air-purification processes and photochemical air-purification processes, which attempt to completely break down the pollutants. In this case, one may also not rule out the formation of unwanted by-products, since not only the desired components but, in principle, all of the components of the air are ionized. In this context, ozone may again be formed, which further reacts to form free radicals, so that unwanted substances are formed. In order to induce as complete a decomposition as possible, both high electron energy/photon energies and free-radical concentrations are necessary, which in turn requires a large amount of power. In addition, the power consumption is inefficient since untroublesome components of the room air are also ionized. Furthermore, these devices also have the disadvantage of occupying a large amount of space, having a considerable weight, and being very expensive to maintain.

Devices are also used to remove dust particles and other microscopic particles from a gas stream. U.S. Pat. No. 4,543,484 describes an example of such a system, which either atomizes or electrically charges the particles to be removed, using a high-energy laser beam. The charged particles are then removed under the influence of an electric field. In this instance, the large amount of electrical power required and the large dimensions are also disadvantageous.

SUMMARY

An object of the present invention is to provide a method for removing gaseous pollutants from the ambient air, as well as a device for implementing the method, through which it is possible to selectively and completely remove undesirable emissions in the ambient air, using relatively simple equipment and relatively little energy.

The method of the present invention for removing gaseous pollutants from the ambient air, which may be used in aircraft cabins and motor-vehicle passenger compartments, distinguishes itself in that the air to be purified is first directed into a purification chamber and then irradiated with optical radiation, so that the pollutants contained in the air to be purified are ionized, using single-photon excitation or multiple-photon excitation. The ionized pollutants are then drawn off by applying an electric field, and are thereby removed from the air to be purified. The single-photon excitation and/or multiple-photon excitation is performed in a resonant and/or non-resonant manner.

The method provides that only the pollutants contained in the air to be purified are ionized and not, for example, components of the air, such as oxygen, nitrogen, carbon dioxide, argon, etc. That is, only the pollutant molecules contained in the air to be purified are selectively ionized, using photoionization, and removed from the air stream by an electric field. The energy of the radiated photons (or light quanta) is not sufficient for ionizing components of air, so that ionized pollutant molecules and non-ionized air molecules may be separated in a simple manner, using an electric field. This type of ionization also does not produce any undesirable or harmful by-products, as is the case with other ionization methods or oxidation methods.

The selective photoionization may be achieved in that the energy of the optical radiation acting on the air to be purified is less than the energy difference between the ground state and the ionization limit of the air molecules, but the energy is high enough to ionize the pollutant molecules contained in the air to be purified.

Since the ionization energy of the main constituents of air, oxygen, nitrogen, carbon dioxide, argon, etc., is typically greater than 12.5 eV, where this value corresponds to the ionization energy of oxygen, an energy less than 12.5 eV may be used. The wavelength of the utilized optical radiation typically lies in the UV range, and the multiple-photon processes may be used.

In this context, photons having the same energy or wavelength or photons having different wavelengths may be used. In a multiple-photon process, one or more intermediate levels may be excited to resonance by suitably selecting the excitation wavelengths, for the effective excitation cross-sections are particularly large. In this instance, it may be necessary to select the wavelengths in such a manner, that the energy of the radiated photons corresponds to the energy of the first intermediate level, or that the sum of the energies of the radiated photons corresponds to the energy of the at least one intermediate level or the energies of several intermediate levels. The closer the photon energies are to the energy levels, the greater the probability of excitation.

By changing the wavelength of the radiation as a function of time, it is also possible to ionize different pollutant molecules one after another, since different pollutant molecules generally have different ionization energies. In this instance, the wavelength of the optical radiation may be varied between 200 nm and 330 nm as a function of time. The ionization of different pollutant molecules may also be performed by selecting the bandwidth of the utilized optical radiation in a suitable manner.

According to another exemplary embodiment, two or more radiation sources emitting optical radiation of different wavelengths may be used. Since radiation of different wavelengths acts simultaneously or alternatingly on the air to be purified, different pollutant molecules may be ionized.

In the instance of photon excitation having more than two stages, is also useful for the optical radiation to additionally include wavelengths in the visible or infrared range, the wavelengths being between 340 nm and 1 mm. Each of the intermediate values may be evaluated.

In the instance that such photon excitation has more than two stages, is also useful to supply, apart from or in addition to optical radiation, microwave radiation and/or electric field energy.

Furthermore, the optical radiation may be pulsed to act on the air to be purified, the repetition rate being between 1 Hz and 200 GHz, and the pulse duration typically being between one ms and 10 fs, e.g. in the picosecond or nanosecond range.

In particular, the pulsed irradiation of the air to be purified may provide that higher optical-radiation intensities may be used, so that effective ionization is possible using single and multiple processes, and gaseous pollutants may therefore be effectively removed from the air.

The device of the present invention for removing gaseous pollutants from the air, e.g. in aircraft passenger compartments and vehicle passenger compartments, includes a purification chamber in which the air to be purified is situated, and at least one radiation source which emits optical radiation and irradiates the air to be purified, so that the pollutants contained in the air to be purified are ionized using single-photon excitation and/or multiple-photon excitation. In addition, an electrode arrangement for generating an electric field is integrated, which means that the ionized pollutants are drawn off and removed from the air to be purified. In this context, the single-photon excitation and/or multiple-photon excitation may be performed in a resonant and/or non-resonant manner. Thus, the air may be effectively purified independently of the temperature and humidity, with little investment in equipment. In addition, the dimensions of the device according to the present invention are small, so that it may easily be built into systems, such as air conditioners, without requiring extensive modifications.

According to an exemplary embodiment, the device has a purification chamber possessing an inlet port for the air to be purified to flow in, as well as two outlet ports, the first outlet port being used to remove the ionized pollutants and the second outlet port being used to direct the purified air further.

In addition, the purification chamber may have a window, through which the air to be purified is irradiated with the optical radiation emitted by the radiation source. Therefore, the air to be purified is directed into an enclosed chamber, which may easily be integrated into existing systems. Furthermore, the separation of the radiation source from the air to be purified may ensure, for example, that the radiation source may easily be replaced at any time.

In addition, a tunable radiation source may be used, so that the optical radiation varies over a predefined wavelength range as a function of time. This allows different pollutants to be ionized in succession. Furthermore, the use of a tunable radiation source allows a suitable wavelength to be set, at which several pollutant molecules are ionized simultaneously.

A pulsed radiation source may be used, since it supplies higher amounts of energy for single-photon ionization and/or multiple-photon ionization of the pollutants.

An alternative exemplary embodiment provides for two or more radiation sources emitting optical radiation of different wavelengths being used, so that different pollutants may be ionized simultaneously. In this context, a UV laser, a UV source, etc. may be provided as a radiation source. In addition, microwave radiation and/or electric field energy may alternatively or additionally be provided, e.g., in the instance of photo excitation having more than two steps.

The device may be used in air-conditioning systems or other air-circulation systems.

DETAILED DESCRIPTION

Figure 1:
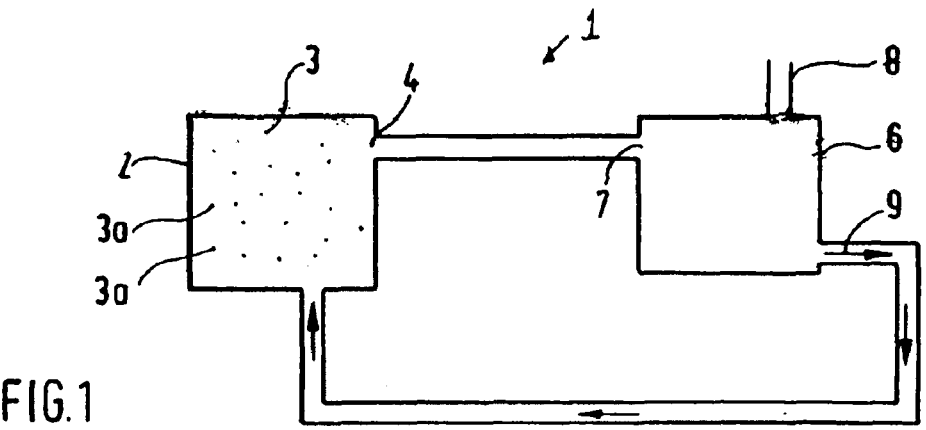
FIG. 1 is a schematic view of an air-circulation system, which includes the device of the present invention.

FIG. 1 is a schematic view of a "closed" air-circulation system 1, in which a device according to the present invention is arranged. Reference numeral 2 indicates an enclosed space that contains air 3. This enclosed space may be the passenger compartment of a passenger car, an aircraft passenger compartment, or any other space. Since the supply of fresh air is limited in many fields of application, the air 3 is normally consumed quite rapidly. Pollutants having a negative effect on well-being and the human organism accumulate to an increasing extent. The pollutants indicated in FIG. 1 by reference numeral 3a are typically VOC's (volatile organic compounds), such as hydrocarbons from gasoline, solvents, odorous substances, etc. In the field of application considered here, the concentration of pollutants lies in the range of a few ppb's ($\mu gm^{-3}$) to the lower ppm range mg/m$^3$, i.e. in the concentration range of emissions. Therefore, the following explanation primarily relates to the area of "indoor air". However, this does not mean that the present invention is limited to such a scope of application.

In order to provide passengers or persons staying in room 2 with a climate that is as pleasant and healthy as possible, and to promote their well-being, it is necessary to clean the air of pollutants 3a. For this purpose, the air to be purified is drawn off through outlet port 4 of chamber 2 and directed on to a purification unit 6. In the circuit 1 illustrated in FIG. 1, this may be accomplished with the aid of a blower or other suitable arrangement for circulating air. In some instances, fresh air may be supplied to circuit 1 at a suitable position.

Figure 2:
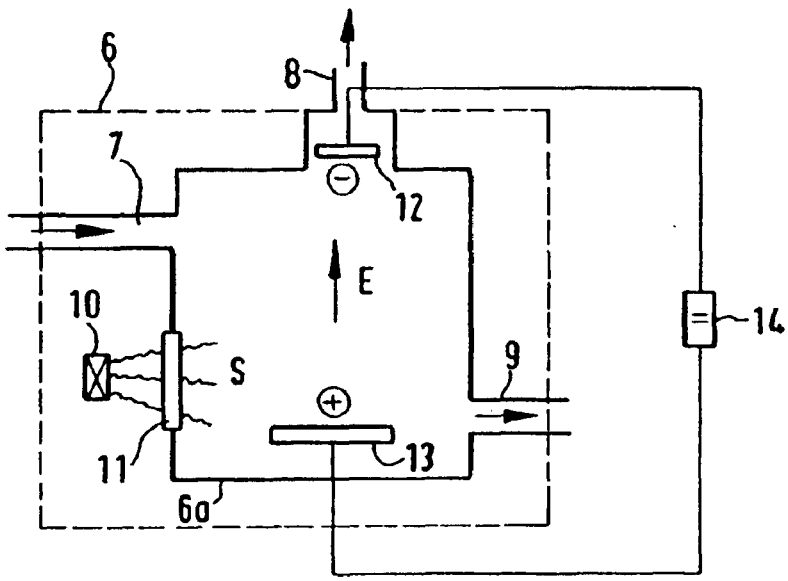
FIG. 2 is a schematic view of the system for removing gaseous pollutants from the ambient air.

The individual components of purification unit 6 are schematically illustrated in FIG. 2. In FIG. 2, purification unit 6 is marked by a dotted line and includes a purification chamber 6a, a radiation source 10, and a pair of electrodes 12 and 13, which is connected to a voltage supply 14. The air 3 to be purified is directed through inlet 7 into purification chamber 6a. The air to be purified is then irradiated with the optical radiation S emitted by radiation source 10. Radiation source 10 is arranged outside purification chamber 6a, so that the air to be purified is irradiated with optical radiation S through a window 11 installed in the outer wall of purification chamber 6a. In this context, the energy of the optical radiation S emitted by radiation source 10 is selected to be sufficient for ionizing only the pollutant molecules contained in the air to be purified, but not the components of the air. The main components of the air are oxygen, nitrogen, argon, and carbon dioxide, and for the sake of simplicity, they are referred to below as components of air. In this instance, one utilizes the fact that the ionization energy of the pollutant molecules to be removed from the air to be purified is less than that of the air components or molecules. Since the ionization energies of oxygen, carbon dioxide, nitrogen, and argon are known to be 12.5 eV, 14.4 eV, 15.5 eV, and 15.7 eV, respectively, this ensures that, when the air to be purified is irradiated at quantum energies less than 12.5 eV (e.g. 12 eV, 11.5 eV, 11 eV, etc.), only the pollutant molecules are ionized, and not the molecules of the air components. Because of an electric field E that is applied between electrodes 12 and 13 inside purification chamber 6a, the ionized pollutant molecules are then drawn off and removed through outlet port 8.

The air purified in this manner is further directed through outlet port 9 and, e.g. back into enclosed space 2, as is indicated by arrows in FIG. 1. The ionization of the air components by the action of optical radiation S, which would otherwise make it impossible to separate the ionized pollutant molecules from the air to be purified, may be prevented by appropriately selecting the energy. In other words, the selective choice of the energy for exciting the electrons allows only the pollutant molecules to be ionized and removed. The formation of undesirable by-products or reaction products due to fragmentation or free-radical formation may be prevented, since, in contrast to ionization processes, such as plasma ionization, a so-called "soft" ionization is performed here.

Figure 3:
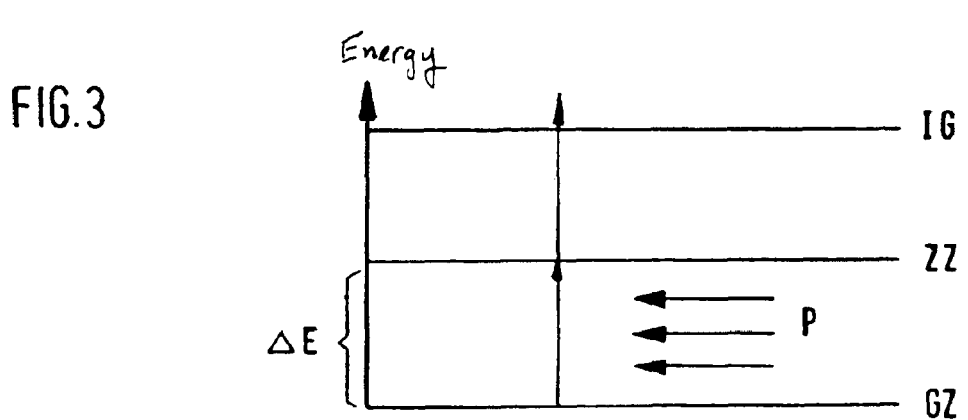
FIG. 3 is a level diagram that explains the principle of photoionization.

The theoretical physical process occurring while the air to be purified is irradiated with optical radiation is described below with reference to FIG. 3. FIG. 3 illustrates a level diagram of a molecule to be ionized. Three different energy states are represented, ground state GZ, an intermediate state ZZ, and ionization limit IG. The action of the optical radiation liberates electrons from the union of pollutant-molecule atoms (atomic bonds of the pollutant molecules), i.e. electrons are elevated above the ionization limit. If the photon energy of the acting optical radiation is greater than the difference in energy between the ionization limit and the ground state, the electrons are released in a single step, and a positively charged molecule remains. Therefore, the ionization process induced by irradiation with light quanta results in direct ionization of the molecules in a single-stage process.

Since the wavelength necessary for this process is relatively small, the ionized state may be produced using two-stage excitation or multistage excitation. In this alternative form of photoionization, the action of the photons initially excites the molecule into an intermediate state. This process is schematically indicated by arrows P in FIG. 3. In this context, the energy of the radiated photons corresponds to energy difference ΔE between the intermediate state and the ground state. Consequently, the elevation of the electrons into the intermediate state is a resonant photon excitation. The electron in the intermediate state may then be elevated over the ionization limit by a further excitation process, so that the electron is ejected and a positively charged molecule remains. This process may also take place over several intermediate steps.

Lasers may be used to attain power densities that are high enough to achieve such multi-photon excitation. Examples of such lasers include UV lasers or other suitable lasers. The lasers used may alternatingly or simultaneously emit at discrete wavelengths, or may also be tunable and emit pulse-shaped or pulsed radiation at high repetition rates, whereby very high ionization yields of up to 100% may be reached, and it is possible to quantitatively remove the pollutants from the air. The repetition rate is typically in the range of a few kHz. When ultra short pulse lasers such as ps lasers or picosecond lasers are used, the repetition rate is typically in the range of 100 MHz.

In addition, different pollutant molecules may simultaneously be ionized by appropriately selecting the bandwidth of the optical radiation acting on the air to be purified. A typical bandwidth of 10 nm appears to be suitable for this. As an alternative, two or more radiation sources emitting optical radiation of different wavelengths and, if desired, different bandwidths may be used.

In addition to lasers, UV lamps may also be used as radiation sources. In this instance, the power density is generally not sufficient for multiple excitation, so that the use of UV lamps only allows photoionization via a single-stage process.

The present invention may be used in a forced-air-circulation air-conditioning system that supplies fresh air, or in other air-circulation systems, but it is not limited to these fields of application. The present invention allows high purification action in the concentration range of emissions, in a manner substantially independent of temperature and humidity, during energy-saving, continuous operation, without a filter change. The elimination of a filter change or the separate degradation of the absorber filter minimizes maintenance. In addition, large exhaust cross-sections produce a very low pressure drop, which may allow for continuous and energy-saving air purification.

What is claimed is:

1. A method for selectively removing gaseous pollutants from the ambient air, comprising the steps of:
   directing the ambient air to be purified into a purification chamber;
   irradiating the ambient air to be purified with optical radiation so that the gaseous pollutants contained in the ambient air to be purified are ionized using at least one of single-photon excitation and multiple-photon excitation; and
   withdrawing the ionized gaseous pollutants by applying an electric field to remove the pollutants from the ambient air to be purified.

2. The method according to claim 1, wherein the at least one of single-photon excitation and multiple-photon excitation is performed in at least one of a resonant and a non-resonant manner.

3. The method according to claim 1, wherein energy of the optical radiation is less than an energy difference between a ground state and an ionization limit of the components of air, the energy being sufficient for ionizing the pollutants in the air to be purified.

4. The method according to claim 1, wherein energy of the optical radiation is less than an ionization energy of oxygen.

5. The method according to claim 1, wherein energy of the optical radiation is less than 12.5 eV.

6. The method according to claim 1, further comprising the step of tuning a wavelength of the optical radiation as a function of time so that different pollutants are ionized in succession.

7. The method according to claim 6, further comprising the step of varying the wavelength of the optical radiation between 200 nm and 330 nm as a function of time.

8. The method according to claim 1, wherein optical radiation of different wavelengths simultaneously acts on the air to be purified, so that different pollutants are simultaneously ionized, the wavelengths in the range of 200 nm to 330 nm.

9. The method according to claim 1, wherein the optical radiation also includes wavelengths in at least one of a visible and an infrared range, the wavelengths in the range of 331 nm to 1 mm when photon excitation is accomplished in more than two stages.

10. The method according to claim 1, further comprising the step of supplying at least one of optical radiation, microwave radiation, and electric-field energy when photon excitation is performed in more than two stages.

11. The method according to claim 1, wherein the optical radiation acts on the air to be purified in a pulsed manner, a repetition rate between 1 Hz and 200 GHz and pulse lengths between 1 ms and 10 fs.

12. The method according to claim 1, wherein the ambient air is located in one of a vehicle passenger compartment and an aircraft passenger compartment.

13. The method according to claim 1, wherein the gaseous pollutants include volatile organic compounds.

14. The method according to claim 13, wherein the volatile organic compounds include hydrocarbons.

15. The method according to claim 1, wherein the ambient air includes indoor air.

16. The method according to claim 3, wherein the components of the ambient air include at least one of oxygen, nitrogen, carbon dioxide, and argon.

17. A device for selectively removing gaseous pollutants from the ambient air, comprising:
- a purification chamber in which the ambient air to be purified is arranged;
- at least one radiation source configured to emit optical radiation and to irradiate the ambient air to be purified with the optical radiation so that the gaseous pollutants contained in the ambient air to be purified are ionized in accordance with at least one of single-photon excitation and multiple-photon excitation; and
- an electrode arrangement configured to generate an electric field to draw off and remove ionized gaseous pollutants from the ambient air to be purified.

18. The device according to claim 17, wherein the radiation source is configured to perform the at least one of the single-photon excitation and the multiple-photon excitation in at least one of a resonant and non-resonant manner.

19. The device according to claim 17, wherein the purification chamber includes an inlet port for the air to be purified to flow in and two outlet ports, one outlet port configured to remove the ionized pollutants and another outlet port configured to direct the purified air further.

20. The device according to claim 17, wherein the purification chamber includes a window, the at least one radiation source configured to emit the optical radiation to irradiate the air to be purified through the window.

21. The device according to claim 17, wherein the at least one radiation source is tunable and is configured to emit optical radiation in one of a continuous and pulsed manner.

22. The device according to claim 17, wherein the at least one radiation source includes at least two radiation sources configured to emit optical radiation of different wavelengths to ionize different pollutants simultaneously.

23. The device according to claim 17, wherein the ambient air is located in one of a motor-vehicle passenger compartment and an aircraft passenger compartment.

24. The device according to claim 17, wherein the at least one radiation source includes a laser.

25. The device according to claim 24, wherein the laser is configured to attain a power density sufficient to ensure the multi-photon excitation.

26. The device according to claim 24, wherein the laser includes at least one of an ultraviolet laser and a picosecond laser.

27. The device according to claim 24, wherein the laser is configured to emit discrete wavelengths at least one of alternatingly and simultaneously.

28. The device according to claim 24, wherein the laser is configured to quantitatively remove the gaseous pollutants.

29. An air-circulation device, comprising:
- a device configured to selectively remove gaseous pollutants from the ambient air, including:
  - a purification chamber in which the ambient air to be purified is arranged;
  - at least one radiation source configured to emit optical radiation and to irradiate the ambient air to be purified with the optical radiation so that the gaseous pollutants contained in the ambient air to be purified are ionized in accordance with at least one of single-photon excitation and multiple-photon excitation; and
  - an electrode arrangement configured to generate an electric field to draw off and remove ionized gaseous pollutants from the ambient air to be purified.

30. The air-circulation device according to claim 29, wherein the air-circulation device includes an air-conditioning device.

* * * * *